United States Patent [19]

Nakamura et al.

[11] Patent Number: 5,876,869
[45] Date of Patent: Mar. 2, 1999

[54] HYDROGEN ABSORBING ALLOY ELECTRODES

[75] Inventors: Hiroshi Nakamura, Oxford, United Kingdom; Teruhiko Imoto, Kadoma, Japan; Toshikazu Yoshida, Hirakata, Japan; Shin Fujitani, Hirakata, Japan; Ikuo Yonezu, Hirakata, Japan

[73] Assignee: Sanyo Electric Co., Ltd., Osaka, Japan

[21] Appl. No.: 759,419

[22] Filed: Dec. 5, 1996

[30] Foreign Application Priority Data

Dec. 7, 1995 [JP] Japan ................................. 7-345603
Dec. 7, 1995 [JP] Japan ................................. 7-345604
Dec. 13, 1995 [JP] Japan ................................. 7-347222

[51] Int. Cl.$^6$ ........................................ H01M 4/38
[52] U.S. Cl. ........................... 429/59; 429/101; 420/900
[58] Field of Search ................... 429/59, 101; 420/900

[56] References Cited

U.S. PATENT DOCUMENTS 5,354,576 10/1994 Zhang et al. .................... 420/900 X
5,389,468 2/1995 Fujiwara et al. ...................... 429/206
5,679,130 10/1997 Lee et al. ........................ 420/900 X

FOREIGN PATENT DOCUMENTS 1-129936   5/1989   Japan .
129936     5/1989   Japan .
3-273062   7/1991   Japan .
162355     6/1992   Japan .
4-162355   6/1992   Japan .
6-68875    3/1994   Japan .
6-124705   5/1994   Japan .

OTHER PUBLICATIONS

Orimo et al.; "Reactive Mechanical Grinding of ZrNi under Various Partial Pressures of Hydrogen", *Journal of Alloys and Compounds*; no month 1995; pp. 287–294.

Hen et al.; "Formation and Stability of Amorphous Zn–Ti alloy by mechanical alloying"; *Journal of Alloys and Compounds*; no month 1994; pp. 27–31.

Chen et al.; "Formation of Metal Hydrides by Mechanical Alloying"; *Journal of Alloys and Compounds*; no month 1995; pp. 181–184.

Singh, et al.; "Synthesis of MmNi$_{4.5}$Al$_{0.5}$ By Mechanical Alloying"; *Int. J. Hydrogen Energy*; vol. 18, No. 7; no month 1993; pp. 567–570.

Song; "Effects of Mechanical Alloying on the Hydrogen Storage Characteristics of Mg–xwt% Ni(x=0, 5, 10, 25 and 55) Mixtures"; *Int. J. Hydrogen Energy*; vol. 20, No. 3; no month 1995; pp. 221–227.

*Primary Examiner*—John S. Maples
*Attorney, Agent, or Firm*—Armstrong Westerman, Hattori, McLeland & Naughton

[57] ABSTRACT

A hydrogen absorbing alloy electrode contains an alloy which comprises particles A of a first hydrogen absorbing alloy and particles B of a second hydrogen absorbing alloy of a composition different from the composition of the first alloy joined to the particles A, with a joint layer C formed at the resulting joint interfaces and having a new composition containing the component elements of the first and second alloys. In a specific embodiment, particles A of a first hydrogen absorbing alloy having a CaCu$_5$-type structure are joined to particles B of a second hydrogen absorbing alloy having a Zr—Ni Laves-phase structure. In another embodiment, particles A of a first hydrogen absorbing alloy having a CaCu$_5$-type structure are joined to particles B of a second hydrogen absorbing alloy having a CaCu$_5$-type structure and different form the first alloy in composition. In another embodiment, particles A of a first hydrogen absorbing alloy having a Zr—Ni Laves-phase structure are joined to particles B of a second hydrogen absorbing alloy having a Zr—Ni Laves-phase structure and different from the first alloy in composition.

12 Claims, 16 Drawing Sheets

FIG. 3

|                 | Zr   | V    | Ni   | Mn   | Mm   | Co   | Al   | Ti   |
|-----------------|------|------|------|------|------|------|------|------|
| Alloy species 1 | 0.00 | 0.00 | 3.10 | 0.44 | 1.00 | 1.00 | 0.40 | 0.06 |
| Alloy species 2 | 1.00 | 0.21 | 1.11 | 0.68 | 0.00 | 0.00 | 0.00 | 0.00 |
| Joint interface | 0.66 | 0.10 | 1.82 | 0.60 | 0.31 | 0.35 | 0.11 | 0.03 |

Unit : atomic ratio

FIG. 4

| | Discharge capacity | | | Initial activation degree (%) | Capacity retentivity (%) |
|---|---|---|---|---|---|
| | 1st cycle (mAh/g) | 50th cycle (mAh/g) | Maximum (mAh/g) | | |
| Product 1 of invention | 231 | 197 | 340 | 68 | 58 |
| Product 2 of invention | 226 | 205 | 342 | 66 | 60 |
| Comparative Example 1 | 196 | 205 | 306 | 64 | 67 |
| Comparative Example 2 | 83 | 119 | 362 | 23 | 33 |
| Comparative Example 3 | 148 | 165 | 336 | 44 | 49 |
| Comparative Example 4 | 166 | 180 | 339 | 49 | 53 |

FIG. 5

|  | Discharge capacity | | | Initial activation degree (%) | Capacity retentivity (%) |
|---|---|---|---|---|---|
|  | 1st cycle (mAh/g) | 50th cycle (mAh/g) | Maximum (mAh/g) | | |
| Product 1 of invention | 290 | 232 | 363 | 80 | 64 |
| Product 2 of invention | 299 | 226 | 365 | 82 | 62 |
| Comparative Example 1 | 218 | 224 | 311 | 70 | 72 |
| Comparative Example 2 | 296 | 116 | 400 | 74 | 29 |
| Comparative Example 3 | 258 | 183 | 358 | 72 | 51 |
| Comparative Example 4 | 274 | 195 | 361 | 76 | 54 |

FIG. 6

| | Discharge capacity | | Initial activation degree (%) | Capacity retentivity (%) |
|---|---|---|---|---|
| | 1st cycle (mAh/g) | 50th cycle (mAh/g) | Maximum (mAh/g) | | |
| Product 1 of invention | 304 | 247 | 358 | 85 | 69 |
| Product 2 of invention | 309 | 234 | 355 | 87 | 66 |
| Comparative Example 1 | 203 | 212 | 303 | 67 | 70 |
| Comparative Example 2 | 296 | 116 | 400 | 74 | 29 |
| Comparative Example 3 | 250 | 176 | 352 | 71 | 50 |
| Comparative Example 4 | 273 | 198 | 354 | 77 | 56 |

FIG. 7

| Alloy mixing ratio (by wt.) | | Maximum capacity (mAh/g) | Initial activation degree (%) | Capacity retentivity (%) |
|---|---|---|---|---|
| 1: MmNi3.0Co0.85Al0.6Mn0.5Ti0.05 | 2: ZrNi1.1V0.2Mn0.7 | | | |
| 0 | 100 | 400 | 74 | 29 |
| 5 | 95 | 396 | 74 | 34 |
| 10 | 90 | 391 | 76 | 42 |
| 15 | 85 | 385 | 76 | 49 |
| 20 | 80 | 380 | 78 | 56 |
| 30 | 70 | 373 | 79 | 63 |
| 40 | 60 | 365 | 82 | 69 |
| 50 | 50 | 360 | 85 | 73 |
| 60 | 40 | 343 | 81 | 71 |
| 70 | 30 | 334 | 78 | 70 |
| 80 | 20 | 324 | 74 | 70 |
| 90 | 10 | 315 | 70 | 69 |
| 95 | 5 | 305 | 68 | 68 |
| 100 | 0 | 300 | 67 | 68 |

FIG. 8

|  | Mm | Ni | Co | Al | Mn |
|---|---|---|---|---|---|
| Alloy species 1 | 1.00 | 3.09 | 1.02 | 0.89 | 0 |
| Alloy species 2 | 1.00 | 3.03 | 0.99 | 0.10 | 0.88 |
| Joint interface | 1.00 | 3.33 | 0.92 | 0.55 | 0.20 |

FIG. 9

| | Discharge capacity | | | Initial activation degree (%) | Capacity retentivity (%) |
|---|---|---|---|---|---|
| | 1st cycle (mAh/g) | 50th cycle (mAh/g) | Maximum (mAh/g) | | |
| Product 1 of invention | 253 | 249 | 328 | 77 | 76 |
| Product 2 of invention | 248 | 261 | 330 | 75 | 79 |
| Comparative Example 1 | 211 | 102 | 310 | 68 | 33 |
| Comparative Example 2 | 134 | 198 | 304 | 44 | 65 |
| Comparative Example 3 | 165 | 156 | 308 | 54 | 51 |

FIG. 10

|  | Discharge capacity | | | Initial activation degree (%) | Capacity retentivity (%) |
| --- | --- | --- | --- | --- | --- |
| | 1st cycle(mAh/g) | 50th cycle(mAh/g) | Maximum (mAh/g) | | |
| Product 1 of invention | 266 | 256 | 328 | 81 | 78 |
| Product 2 of invention | 261 | 264 | 330 | 79 | 80 |
| Comparative Example 1 | 213 | 144 | 300 | 71 | 48 |
| Comparative Example 2 | 134 | 198 | 304 | 44 | 65 |
| Comparative Example 3 | 158 | 168 | 302 | 52 | 56 |

FIG. 11

| | Discharge capacity | | | Initial activation degree (%) | Capacity retentivity (%) |
|---|---|---|---|---|---|
| | 1st cycle(mAh/g) | 50th cycle(mAh/g) | Maximum(mAh/g) | | |
| Product 1 of invention | 276 | 262 | 328 | 84 | 80 |
| Product 2 of invention | 274 | 271 | 330 | 83 | 82 |
| Comparative Example 1 | 217 | 155 | 310 | 70 | 50 |
| Comparative Example 2 | 134 | 198 | 304 | 44 | 65 |
| Comparative Example 3 | 174 | 174 | 308 | 56 | 56 |

FIG. 12

| Alloy mixing ratio (by wt.) | | Maximum capacity (mAh/g) | Initial activation degree (%) | Capacity retentivity (%) |
| --- | --- | --- | --- | --- |
| 1 : MmNi3.1Co0.9Al0.3Mn0.7 | 2 : MmNi3.0Co1.0Al0.9Mn0.1 | | | |
| 0 | 100 | 304 | 44 | 65 |
| 5 | 95 | 304 | 56 | 66 |
| 10 | 90 | 300 | 56 | 68 |
| 15 | 85 | 310 | 60 | 68 |
| 20 | 80 | 310 | 72 | 70 |
| 30 | 70 | 318 | 76 | 78 |
| 40 | 60 | 326 | 80 | 78 |
| 50 | 50 | 328 | 84 | 80 |
| 60 | 40 | 326 | 82 | 78 |
| 70 | 30 | 310 | 78 | 76 |
| 80 | 20 | 310 | 76 | 72 |
| 90 | 10 | 308 | 72 | 62 |
| 95 | 5 | 308 | 70 | 60 |
| 100 | 0 | 310 | 70 | 50 |

FIG. 13

|                 | Zr   | Ni   | Mn   | V    | Co   |
|-----------------|------|------|------|------|------|
| Alloy species 1 | 1.00 | 1.08 | 0.68 | 0.20 | 0    |
| Alloy species 2 | 1.00 | 1.10 | 0.51 | 0.21 | 0.19 |
| Joint interface | 1.00 | 1.51 | 0.33 | 0.10 | 0.05 |

FIG. 14

|  | Discharge capacity | | | Initial activation degree (%) | Capacity retentivity (%) |
| --- | --- | --- | --- | --- | --- |
|  | 1st cycle(mAh/g) | 50th cycle(mAh/g) | Maximum(mAh/g) | | |
| Product 1 of invention | 275 | 241 | 382 | 72 | 63 |
| Product 2 of invention | 271 | 244 | 381 | 71 | 64 |
| Comparative Example 1 | 295 | 119 | 398 | 74 | 30 |
| Comparative Example 2 | 143 | 233 | 358 | 40 | 65 |
| Comparative Example 3 | 214 | 177 | 376 | 57 | 47 |

FIG. 15

| | Discharge capacity | | | Initial activation degree (%) | Capacity retentivity (%) |
|---|---|---|---|---|---|
| | 1st cycle(mAh/g) | 50th cycle(mAh/g) | Maximum(mAh/g) | | |
| Product 1 of invention | 290 | 223 | 372 | 78 | 60 |
| Product 2 of invention | 292 | 228 | 374 | 78 | 61 |
| Comparative Example 1 | 295 | 119 | 398 | 74 | 30 |
| Comparative Example 2 | 154 | 188 | 342 | 45 | 55 |
| Comparative Example 3 | 223 | 156 | 372 | 60 | 42 |

FIG. 16

| | Discharge capacity | | | Initial activation degree (%) | Capacity retentivity (%) |
|---|---|---|---|---|---|
| | 1st cycle(mAh/g) | 50th cycle(mAh/g) | Maximum(mAh/g) | | |
| Product 1 of invention | 293 | 278 | 376 | 78 | 74 |
| Product 2 of invention | 288 | 281 | 374 | 77 | 75 |
| Comparative Example 1 | 295 | 119 | 398 | 74 | 30 |
| Comparative Example 2 | 135 | 245 | 355 | 38 | 69 |
| Comparative Example 3 | 209 | 183 | 374 | 56 | 49 |

FIG. 17

| Alloy mixing ratio (by wt.) | | Maximum capacity (mAh/g) | Initial activation degree (%) | Capacity retentivity (%) |
|---|---|---|---|---|
| 1 : ZrNi1.1Mn0.7V0.2 | 2 : ZrNi1.4Mn0.1V0.5 | | | |
| 0 | 100 | 355 | 38 | 69 |
| 5 | 95 | 357 | 61 | 70 |
| 10 | 90 | 359 | 64 | 71 |
| 15 | 85 | 361 | 67 | 71 |
| 20 | 80 | 364 | 70 | 72 |
| 30 | 70 | 368 | 74 | 73 |
| 40 | 60 | 376 | 76 | 74 |
| 50 | 50 | 376 | 78 | 74 |
| 60 | 40 | 381 | 77 | 70 |
| 70 | 30 | 385 | 75 | 66 |
| 80 | 20 | 389 | 75 | 57 |
| 90 | 10 | 394 | 74 | 49 |
| 95 | 5 | 396 | 74 | 41 |
| 100 | 0 | 398 | 74 | 30 |

HYDROGEN ABSORBING ALLOY ELECTRODES

FIELD OF THE INVENTION

The present invention relates to hydrogen absorbing alloy electrodes for use as negative electrodes of batteries, and more particularly to hydrogen absorbing alloy electrodes prepared from different kinds of hydrogen absorbing alloys and thereby given improved properties with respect to initial activation and charge-discharge cycle life (capacity retentivity).

BACKGROUND OF THE INVENTION

Hydrogen absorbing alloy electrodes must be great in discharge capacity and great in the degree of initial activation of the hydrogen absorbing alloy and have a prolonged charge-discharge cycle life. Accordingly, it has been proposed to prepare electrodes from a mixture of different kinds of hydrogen absorbing alloys so as to give the electrode the characteristics of the different alloys (for example, JP-A-129936/1989, -173062/1991 and -162355/1992).

For example, hydrogen absorbing alloys with an $AB_5$-type crystal structure have a relatively great degree of initial activation and a relatively long charge-discharge cycle life, but are small in discharge capacity. On the other hand, hydrogen absorbing alloys having an $AB_2$-type crystal structure are relatively great in discharge capacity but small in the degree of initial activation and short in charge-discharge cycle life. It is therefore practice to prepare hydrogen absorbing alloy electrodes by mixing together a hydrogen absorbing alloy of $AB_5$-type crystal structure and a hydrogen absorbing alloy of $AB_2$-type crystal structure, molding the mixture and sintering the molded mixture.

Furthermore, $AB_2$-type hydrogen absorbing alloys having a Zr—Ni Laves-phase structure are known as alloys having a great discharge capacity. While such alloys vary in properties depending on the composition, the degree of initial activation and the charge-discharge cycle life thereof are generally in trade-off relationship with each other; the alloys excellent in one of these properties are inferior in the other. Accordingly, an $AB_2$-type alloy (e.g., Zr—Mn—V—Ni alloy) of a composition ensuring a great initial activation degree is mixed with another $AB_2$-type alloy (e.g., Zr—Ti—V—Ni alloy) of a composition having a long charge-discharge cycle life to prepare hydrogen absorbing alloy electrodes from the mixture. The electrodes obtained are improved in both the properties of initial activation degree and charge-discharge cycle life.

In the case where electrodes are prepared from a sintered mixture of $AB_5$-type hydrogen absorbing alloy and $AB_2$-type hydrogen absorbing alloy as conventionally practiced (JP-A-162355/1992), or in the case of hydrogen absorbing alloy electrodes prepared from an alloy wherein the surfaces of $AB_2$-type hydrogen absorbing alloy particles are covered with finer $AB_5$-type hydrogen absorbing alloy particles (JP-A-173062/1991), joint interfaces are formed between the $AB_2$-type hydrogen absorbing alloy particles and the $AB_5$-type hydrogen absorbing alloy particles, whereas the joint interfaces are not exposed on the surfaces where hydrogen absorption and desorption reactions proceed, so that the electrodes are not effectively improved in initial activation and charge-discharge cycle life. Alternatively when one of $AB_5$-type hydrogen absorbing alloy and $AB_2$-type hydrogen absorbing alloy is coated with an electrically conductive metal or ceramic and then mixed with the other alloy in a bare state, followed by sintering to prepare electrodes from the sintered mixture, the electrodes fail to exhibit a fully improved initial activation degree since joint interfaces are not satisfactorily formed between $AB_5$-type hydrogen absorbing alloy particles and $AB_2$-type hydrogen absorbing alloy particles owing to the coating.

When hydrogen absorbing alloy electrodes are prepared by mixing together hydrogen absorbing alloys of different crystal structures and sintering the mixture as in the prior art, the characteristics available are merely approximate to the average of those of the alloys. Thus, the electrodes fail to exhibit outstanding characteristics synergistically resulting from the characteristics of the component hydrogen absorbing alloys.

Further hydrogen absorbing alloy electrodes prepared from a mixture of hydrogen absorbing alloys which are merely different in kind as heretofore practiced have characteristics which are also approximate to the average of the characteristics of the different alloys, and it is impossible to obtain characteristics synergistically resulting from the different hydrogen absorbing alloys.

SUMMARY OF THE INVENTION

An object of the present invention is to provide an electrode prepared from different kinds of hydrogen absorbing alloys and having characteristics superior to the inherent characteristics of the hydrogen absorbing alloy materials with respect to both initial activation and charge-discharge cycle life.

The present invention provides a hydrogen absorbing alloy electrode which comprises at least two kinds of hydrogen absorbing alloys having different compositions and wherein particles A of a first hydrogen absorbing alloy having a $CaCu_5$-type structure are joined to particles B of a second hydrogen absorbing alloy having a Zr—Ni Laves-phase structure to form at the resulting joint interfaces a joint layer C of a new composition containing the component elements of the first and second hydrogen absorbing alloys.

The particles A of the first hydrogen absorbing alloy are joined to the particles B of the second hydrogen absorbing alloy by sintering or mechanical alloying, whereby the surfaces of particles A and B to be joined are heated, permitting the component elements of the first and second alloys to diffuse through the joints to form a joint layer C of new composition.

With the alloy described, the first hydrogen absorbing alloy has a $CaCu_5$-type structure, which affords an increased degree of initial activation. The second hydrogen absorbing alloy has a Zr—Ni Laves-phase structure, which provides an increased discharge capacity. Furthermore, the joint layer C having a new composition different from those of the first and second hydrogen absorbing alloys exhibits the characteristics of the two alloys in synergism.

Consequently, the electrode in its entirety exhibits characteristics superior to the inherent characteristics of the first and second hydrogen absorbing alloys in respect of both initial activation degree and charge-discharge cycle life.

Stated more specifically, the first hydrogen absorbing alloy has a double-phase $CaCu_5$-type crystal structure, and the second hydrogen absorbing alloy has an $AB_2$-type Laves-phase structure of single phase.

Since the first hydrogen absorbing alloy has a double-phase crystal structure, a further improved degree of initial activation is available. On the other hand, the second hydrogen absorbing alloy has a single-phase crystal structure and is therefore superior in discharge capacity. The joint layer C accordingly has outstanding characteristics synergistically resulting from these characteristics.

More specifically stated, the first and second hydrogen absorbing alloys are substantially identical in equilibrium hydrogen pressure at the same temperature. This enables hydrogen to readily pass through the interface between the first hydrogen absorbing alloy and the second hydrogen absorbing alloy joined thereto, consequently further improving the initial activation degree and charge-discharge cycle life of the hydrogen absorbing alloy electrode.

More specifically stated, the hydrogen absorbing alloy which is the lower of the two hydrogen absorbing alloys in proportion is present in a proportion of at least 5 wt. %. This reliably forms the required joint layer C between the particles A of the first hydrogen absorbing alloy and the particles B of the second hydrogen absorbing alloy.

With respect to the degree of initial activation and charge-discharge cycle life, the hydrogen absorbing alloy electrode embodying the invention has characteristics synergistically afforded by, and superior to, the inherent characteristics of the different component hydrogen absorbing alloys.

While the hydrogen absorbing alloys of $AB_5$-type crystal structure have characteristics which vary with the composition thereof, the degree of initial activation is generally in trade-off relation with charge-discharge cycle life, such that the alloy which is excellent in one of these characteristics is inferior in the other. Accordingly, if an $AB_5$-type alloy with a composition of superior initial activation degree and another $AB_5$-type alloy with a composition of superior charge-discharge cycle life are mixed together and made into a hydrogen absorbing alloy electrode by molding and sintering, the electrode obtained possesses the characteristics of both alloys. The fact that the electrode is made of two kinds of $AB_5$-type alloys having the same crystal structure renders hydrogen highly mobile in the electrode, realizing improvements in both the characteristics of initial activation degree and charge-discharge cycle life.

The present invention provides another hydrogen absorbing alloy electrode wherein particles A of a first hydrogen absorbing alloy having a $CaCu_5$-type structure are joined to particles B of a second hydrogen absorbing alloy having a $CaCu_5$-type structure and different from the first hydrogen absorbing alloy in composition to form at the resulting joint interfaces a joint layer C of a new composition containing the component elements of the first and second hydrogen absorbing alloys.

The particles A of the first hydrogen absorbing alloy are joined to the particles B of the second hydrogen absorbing alloy by sintering or mechanical alloying, whereby the surfaces of particles A and B to be joined are heated, permitting the component elements of the first and second alloys to diffuse through the joints to form a joint layer C of new composition.

With the hydrogen absorbing alloy electrode of the invention stated above, the first hydrogen absorbing alloy used has a composition of excellent degree of initial activation, and the second hydrogen absorbing alloy used has a composition of excellent charge-discharge cycle life, with the result that the joint layer C exhibits characteristics synergistically resulting from those of the two alloys.

Consequently, the electrode in its entirety exhibits characteristics superior to the inherent characteristics of the first and second hydrogen absorbing alloys in respect of both initial activation degree and charge-discharge cycle life.

Stated more specifically, the first and second hydrogen absorbing alloys are the same in respect of the component elements. This enables hydrogen to readily pass through the joint interface between the first and second hydrogen absorbing alloys, consequently giving improved initial activation degree and charge-discharge cycle life to the electrode.

With respect to the degree of initial activation and charge-discharge cycle life, the hydrogen absorbing alloy electrode embodying the invention has characteristics synergistically afforded by, and superior to, the inherent characteristics of the different component hydrogen absorbing alloys.

The present invention provides another hydrogen absorbing alloy electrode which comprises at least two kinds of hydrogen absorbing alloys having different compositions and wherein particles A of a first hydrogen absorbing alloy having a Zr—Ni Laves-phase structure are joined to particles B of a second hydrogen absorbing alloy having a Zr—Ni Laves-phase structure and different from the first hydrogen absorbing alloy in composition to form at the resulting joint interfaces a joint layer C of a new composition containing the component elements of the first and second hydrogen absorbing alloys.

The particles A of the first hydrogen absorbing alloy are joined to the particles B of the second hydrogen absorbing alloy by sintering or mechanical alloying, whereby the surfaces of particles A and B to be joined are heated, permitting the component elements of the first and second alloys to diffuse through the joints to form a joint layer C of new composition.

With the hydrogen absorbing alloy electrode of the invention stated above, the first hydrogen absorbing alloy used has a composition of excellent degree of initial activation, and the second hydrogen absorbing alloy used has a composition of excellent charge-discharge cycle life, with the result that the joint layer C exhibits characteristics synergistically resulting from those of the two alloys.

Consequently, the electrode in its entirety exhibits characteristics superior to the inherent characteristics of the first and second hydrogen absorbing alloys in respect of both initial activation degree and charge-discharge cycle life.

With respect to the degree of initial activation and charge-discharge cycle life, the hydrogen absorbing alloy electrode embodying the invention has characteristics synergistically afforded by, and superior to, the inherent characteristics of the different component hydrogen absorbing alloys.

BRIEF DESCRIPTION OF THE DRAWINGS

FIG. 3 is a table showing the result of EPMA analysis conducted for a first embodiment;

FIG. 4 is a table showing electrochemical characteristics determined of hydrogen absorbing alloy electrodes prepared from two kinds of alloys in combination;

FIG. 5 is a table showing like characteristics afforded by other alloy combinations;

FIG. 6 is a table showing like characteristics obtained by other alloy combinations;

FIG. 7 is a table showing variations in electrochemical characteristics at varying alloy mixing ratios;

FIG. 8 is a table showing the result of EPMA analysis conducted for a second embodiment;

FIG. 9 is a table showing electrochemical characteristics determined of hydrogen absorbing alloy electrodes prepared from two kinds of alloys in combination;

FIG. 10 is a table showing like characteristics afforded by other alloy combinations;

FIG. 11 is a table showing like characteristics obtained by other alloy combinations;

FIG. 12 is a table showing variations in electrochemical characteristics at varying alloy mixing ratios;

FIG. 13 is a table showing the result of EPMA analysis conducted for a third embodiment;

FIG. 14 is a table showing electrochemical characteristics determined of hydrogen absorbing alloy electrodes prepared from two kinds of alloys in combination;

FIG. 15 is a table showing like characteristics afforded by other alloy combinations;

FIG. 16 is a table showing like characteristics obtained by other alloy combinations; and FIG. 17 is a table showing variations in electrochemical characteristics at varying alloy mixing ratios.

DETAILED DESCRIPTION OF EMBODIMENTS
First Embodiment

Figure 1:
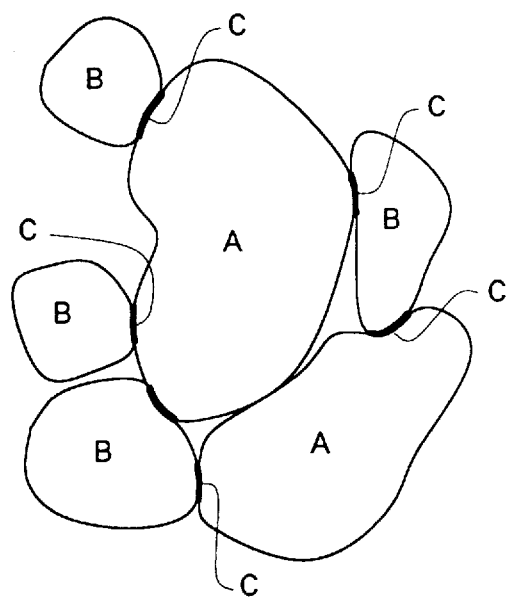
FIG. 1 is an enlarged diagram showing the structure of a hydrogen absorbing alloy electrode embodying the invention.

With reference to FIG. 1, a hydrogen absorbing alloy electrode embodying the invention comprises particles A of a first hydrogen absorbing alloy having a $CaCu_5$-type structure, and particles B of a second hydrogen absorbing alloy joined to the particles A and having a Zr—Ni Laves-phase structure, with a joint layer C formed at the resulting joint interfaces and having a new composition containing the component elements of the first and second hydrogen absorbing alloys.

Prepared as first hydrogen absorbing alloys which are excellent in initial activation degree and charge-discharge cycle life for use in the first embodiment are $MmNi_{3.1}CoAl_{0.2}Mn_{0.7}$ (mother alloy A1) having a single-phase crystal structure, $MmNi_{3.1}CoAl_{0.4}Mn_{0.45}Ti_{0.05}$ (mother alloy A2) having a double-phase crystal structure, and $MmNi_{3.1}Co_{0.9}Al_{0.45}Mn_{0.5}Ti_{0.5}$ (mother alloy A3) having a double-phase crystal structure. Further prepared as second hydrogen absorbing alloys having a great discharge capacity are $ZrNi_{1.2}V_{0.4}Mn_{0.4}$ (mother alloy B1) having a double-phase crystal structure, and $ZrNi_{1.1}V_{0.2}Mn_{0.7}$ (mother alloy B2) having a single-phase crystal structure. At 40° C. and at a hydrogen concentration of 0.5 (H/M), the hydrogen absorbing alloys have the following equilibrium hydrogen pressures: 0.52 atm for mother alloy A1, 0.41 atm for mother alloy A2, 0.22 atm for mother alloy A3, 0.25 atm for mother alloy B1, and 0.21 atm for mother alloy B2. Mm (misch metal) for use in the present embodiment is a mixture of rare-earth elements in the La:Ce:Pr:Nd ratio of 30:40:10:20 (by weight).

Using the combinations of mother alloy A1 and mother alloy B1, the combination of mother alloy A2 and mother alloy B2 and the combination of mother alloy A3 and mother alloy B2, hydrogen absorbing alloy electrodes for testing were prepared by the processes to be described later, and the test samples were checked for electrochemical characteristics (single-electrode characteristics).

Described below are a process for preparing the mother alloys, processes for preparing the electrodes, a method of determining the electrochemical characteristics and the results of determination.

A. Preparation of Mother Alloys

The component elements of each of mother alloys A1 to A3, B1 and B2 were mixed together in a specified molar ratio, melted in an arc furnace having an argon atmosphere and then spontaneously cooled to prepare a block of hydrogen absorbing alloy. The alloy block was pulverized into a powder having a mean particle size of 120 μm.

B. Preparation of Hydrogen Absorbing Alloy Electrodes

Hydrogen absorbing alloys were prepared from 50 g portions of the mother alloy powders by mixing the powder portions in the above-mentioned combinations, followed by sintering or mechanical alloying.

For sintering, each powder mixture was held heated in an inert gas at 1000° C. for 8 hours, whereby the two mother alloy powders were joined to each other and made into a composite material. For mechanical alloying, the powder mixture was placed into a rotor rotating at a high speed (13,000 r.p.m.) and thereby repeatedly subjected to mechanical energy such as impact force or frictional force. The two mother alloy powders were joined to each other with the heat generated by the process and made into a composite material. The composition of each of the hydrogen absorbing alloys thus prepared was determined by EPMA analysis.

Each alloy prepared by sintering or mechanical alloying was pulverized into a powder having a mean particle size of 75 μm, whereby the joint interfaces between the alloy particles having a $CaCu_5$-type structure and the alloy particles having a Zr—Ni Laves-phase structure were exposed on the resulting surfaces.

A hydrogen absorbing alloy electrode in the form of a disk with a diameter of 20 mm was prepared by mixing 0.1 g of polytetrafluoroethylene (PTFE) serving as a binder with 0.5 g of the alloy powder, filling a porous piece of blowing nickel (conductive substrate) with the mixture and press-molding the resulting piece at 1.2 tons/cm². The electrode can be prepared alternatively by adding an aqueous solution containing a binder to the alloy powder to obtain a paste, and coating opposite surfaces of a nickel-plated piece of punching metal (conductive substrate) with the paste.

C. Determination of Electrochemical Characteristics

Figure 2:
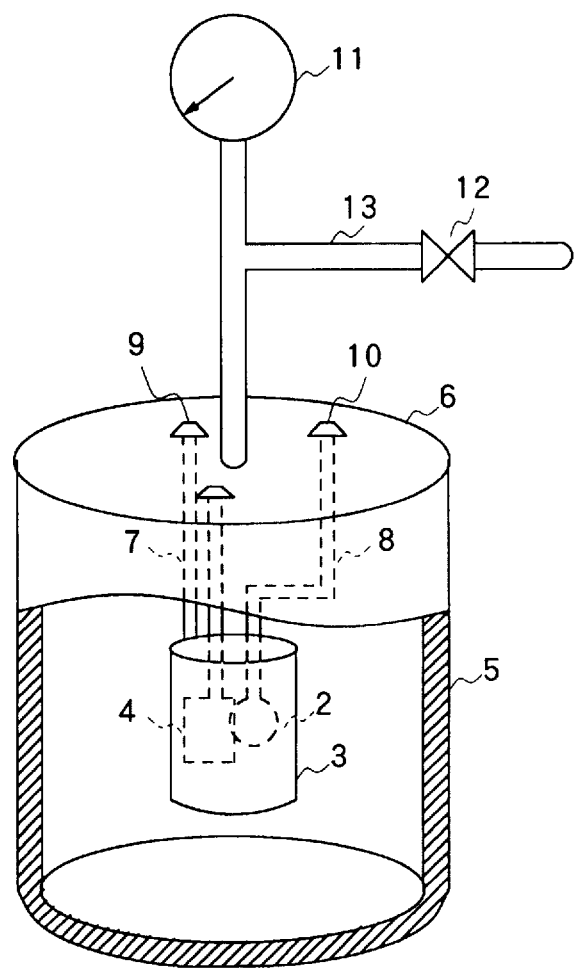
FIG. 2 is a perspective view partly broken away and showing the construction of a single electrode testing cell for use in determining electrochemical characteristics.

As shown in FIG. 2, cells for testing a single electrode were assembled for the determination of electrochemical characteristics. As illustrated, each test cell comprises a closed polypropylene container 5 of insulating properties, and three electrodes arranged in the interior of the container 5, i.e., a test electrode 2 which is the hydrogen absorbing electrode to be tested, a sintered nickel electrode 3 in the form of a hollow cylinder and having a sufficiently greater electrochemical capacity than the test electrode 2, and a sintered nickel reference electrode 4 in the form of a plate. The sintered nickel electrode 3 is supported by the lower end of a positive-electrode lead 7 connected to the top wall 6 of the closed container 5. The test electrode 2 is accommodated in the nickel electrode 3 centrally thereof and vertically supported by the lower end of a negative-electrode lead 8 connected to the top wall 6 of the container 5.

The leads 7 and 8 extend through the top wall 6 of the container 5 and are connected respectively to a positive-electrode terminal 9 and a negative-electrode terminal 10. The test electrode 2 and the nickel electrode 3 are immersed in an alkali electrolyte (30 wt. % aqueous solution of potassium hydroxide) placed in the container 5. The closed container 5 is filled with nitrogen gas in an upper space above the alkali electrolyte to subject the test electrode 2 to a predetermined pressure (7 atm). Connected to the center of top wall 6 of the container 5 is a relief pipe 13 provided with a pressure gauge 11 and a relief valve 12 for preventing the internal pressure of the container 5 from building up above the predetermined value.

For the determination of electrochemical characteristics, each test cell was charged at room temperature and 50 mA/g for 8 hours, then held at rest for 1 hour, subsequently discharged at 50 mA/g to a final voltage of 0.9 V and thereafter held at rest for 1 hour. This charge-discharge cycle was repeated to measure the discharge capacity (mAh/g) every charge-discharge cycle.

D. Results of Determination

FIG. 3 shows the result of EPMA analysis conducted for the hydrogen absorbing alloy electrode prepared by sintering from the foregoing combination of mother alloy A2 ($MmNi_{3.1}CoAl_{0.4}Mn_{0.45}Ti_{0.05}$) and mother alloy B2 ($ZrNi_{1.1}V_{0.2}Mn_{0.7}$)

As illustrated, the components of mother alloy A2 are detected in the respective molar ratios as an alloy species 1, and the components of mother alloy B2 are detected in the listed molar ratios as an alloy species 2. Further a new composition different from the compositions of the alloy species 1, 2 is detected at joint interfaces between alloy particles. The same result as above was obtained with the hydrogen absorbing alloy electrode prepared by mechanical alloying.

These results indicate that the sintering or mechanical alloying process forms a joint layer C of new composition containing the component elements of the mother alloys A2, B2 at the joint interface therebetween.

FIG. 4 shows the electrochemical characteristics of hydrogen absorbing alloy electrodes determined. These electrodes are an electrode (Product 1 of the invention) prepared from "alloy combination 1," i.e., the combination of mother alloy A1 ($MmNi_{3.1}CoAl_{0.2}Mn_{0.7}$ alloy of single phase) and mother alloy B1 ($ZrNi_{1.2}V_{0.4}Mn_{0.4}$ alloy of double phase) by sintering, an electrode (Product 2 of the invention) prepared from the same "alloy combination 1" by mechanical alloying, an electrode (Comparative Example 1) prepared from mother alloy A1 only, an electrode (Comparative Example 2) prepared from mother alloy B1 only, an electrode (Comparative Example 3) prepared from the powder mixture of mother alloy A1 and mother alloy B1 by press molding only without sintering or mechanical alloying, and an electrode (Comparative Example 4) prepared from the powder mixture of mother alloy A1 and mother alloy B1 by press molding and subsequent sintering.

The discharge capacity values listed are the value given by the first cycle which is governed by the initial activation degree, the value given by the 50th cycle which is governed by charge-discharge cycle life and the maximum capacity value obtained during the repeated charge-discharge cycles. The initial activation degree is expressed in terms of the ratio (%) of the discharge capacity of the first cycle to the maximum capacity. The initial activation degree can be quantitatively evaluated by this ratio. The capacity retentivity is expressed in terms of the ratio (%) of the discharge capacity of the 50th cycle to the maximum capacity. The charge-discharge cycle life can be quantitatively determined by this value.

With Comparative Example 3, the two kinds of mother alloys are merely mixed together, failing to form joint interfaces, and the initial activation degree and the capacity retentivity attained reflect nothing more than an effect of the combination of Comparative Examples 1 and 2. Comparative Example 4 fails to achieve a sufficient improvement since joint interfaces are not exposed. Products 1 and 2 of the invention are superior to Comparative Examples in initial activation degree and capacity retentivity. This substantiates that the exposed joint interfaces produce a synergistic effect on the initial activation degree and charge-discharge cycle life.

FIG. 5 shows the electrochemical characteristics of hydrogen absorbing alloy electrodes determined. These electrodes are an electrode (Product 1 of the invention) prepared from "alloy combination 2," i.e., the combination of mother alloy A2 ($MmNi_{3.1}CoAl_{0.4}Mn_{0.45}Ti_{0.05}$ alloy of double phase) and mother alloy B2 ($ZrNi_{1.1}V_{0.2}Mn_{0.7}$ alloy of single phase) by sintering, an electrode (Product 2 of the invention) prepared from the same "alloy combination 2" by mechanical alloying, an electrode (Comparative Example 1) prepared from mother alloy A2 only, an electrode (Comparative Example 2) prepared from mother alloy B2 only, an electrode (Comparative Example 3) prepared from the powder mixture of mother alloy A2 and mother alloy B2 by press molding only without sintering or mechanical alloying, and an electrode (Comparative Example 4) prepared from the powder mixture of mother alloy A2 and mother alloy B2 by press molding and subsequent sintering.

Products 1 and 2 of the invention achieve a further improvement over "alloy combination 1" both in initial activation degree and in capacity retentivity.

The improvement is attributable to the use of "alloy combination 2" wherein mother alloy A2 has a double phase and mother alloy B2 has a single phase. More specifically, the double-phase crystal structure of mother alloy A2 results in a higher initial activation degree and greater capacity retentivity than the single phase, while the single-phase crystal structure of mother alloy B2 gives a greater discharge capacity than the double phase. These effects are synergistically produced at the joint interfaces, enabling the electrode in its entirety to attain improvements over "alloy combination 1" in initial activation degree and capacity retentivity.

FIG. 6 shows the electrochemical characteristics of hydrogen absorbing alloy electrodes determined. These electrodes are an electrode (Product 1 of the invention) prepared from "alloy combination 3," i.e., the combination of mother alloy A3 ($MmNi_{3.1}Co_{0.9}Al_{0.45}Mn_{0.5}Ti_{0.05}$ alloy of double phase) and mother alloy B2 ($ZrNi_{1.1}V_{0.2}Mn_{0.7}$ alloy of single phase) by sintering, an electrode (Product 2 of the invention) prepared from the same "alloy combination 3" by mechanical alloying, an electrode (Comparative Example 1) prepared from mother alloy A3 only, an electrode (Comparative Example 2) prepared from mother alloy B2 only, an electrode (Comparative Example 3) prepared from the powder mixture of mother alloy A3 and mother alloy B2 by press molding only without sintering or mechanical alloying, and an electrode (Comparative Example 4) prepared from the powder mixture of mother alloy A3 and mother alloy B2 by press molding and subsequent sintering.

Products 1 and 2 of the invention both achieve a higher initial activation degree and greater capacity retentivity than "alloy combination 2." Presumably, the reason is that since mother alloy A3 and mother alloy B2 have approximately the same equilibrium hydrogen pressure at the same temperature in the case of "alloy combination 3," the interface between mother alloy A3 and mother alloy B2 permits hydrogen to readily pass therethrough, hence further improvements in initial activation degree and capacity retentivity.

Hydrogen absorbing alloy electrodes were prepared by sintering from combinations of alloys equivalent to "alloy combination 3," i.e., from $MmNi_{3.0}Co_{0.85}Al_{0.6}Mn_{0.5}Ti_{0.05}$ alloy and $ZrNi_{1.1}V_{0.2}Mn_{0.7}$ alloy as mixed together in varying ratios, and tested for maximum capacity, initial activation degree and capacity retentivity. FIG. 7 shows the results.

These results indicate that when the proportions of the two alloys are 50 wt. %, the greatest improvement is achieved both in initial activation degree and in capacity retentivity, and that the effect lowers as the proportion of one of the alloys decreases. If the proportion decreases below 5 wt. %, the initial activation degree, as well as the capacity retentivity, lowers below the allowable limit. This is because the joint layer C is not formed satisfactorily if the proportion of one of the alloys is smaller than 5 wt. %.

Accordingly, the proportion of one of the alloys to be mixed together is preferably 20 to 80 wt. %, more preferably 40 to 60 wt. %, most preferably 50 wt. %.

In the case where alkali dry batteries (battery capacity: 1,000 mAh) of AA size and of the type wherein the positive electrode is dominant are to be assembled using the hydrogen absorbing alloy electrode thus prepared as the negative electrode, the other components of the battery to be used include a known centered nickel electrode serving as the positive electrode, a separator of alkali-resistant nonwoven fabric and 30 wt. % aqueous solution of potassium hydroxide serving as the electrolyte. The alkali dry battery then obtained exhibits higher performance than conventionally.

Other known alloy is usable as the first hydrogen absorbing alloy insofar as the alloy has a $CaCu_5$-type structure. Other known alloy having a Zr—Ni Laves-phase structure is usable as the second hydrogen absorbing alloy.

Second Embodiment

With reference to FIG. 1, a hydrogen absorbing alloy electrode embodying the invention comprises particles A of a first hydrogen absorbing alloy having a $CaCu_5$-type structure, and particles B of a second hydrogen absorbing alloy joined to the particles A, having a $CaCu_5$-type structure and different from the first hydrogen absorbing alloy in composition, with a joint layer C formed at the resulting joint interfaces and having a new composition containing the component elements of the first and second hydrogen absorbing alloys.

Prepared for use in the present embodiment as first hydrogen absorbing alloys which are excellent in initial activation degree are $MmNi_{3.1}Co_{1.0}Mn_{0.9}$ alloy (mother alloy A1), $MmNi_{3.3}Co_{0.9}Al_{0.1}Mn_{0.7}$ alloy (mother alloy A2) and $MmNi_{3.1}Co_{0.9}Al_{0.3}Mn_{0.7}$ alloy (mother alloy A3) which have an $AB_5$-type crystal structure. Further prepared as a second hydrogen absorbing alloy excellent in charge-discharge cycle life is $MmNi_{3.0}Co_{1.0}Al_{0.9}Mn_{0.1}$ alloy (mother alloy B1) having an $AB_5$-type crystal structure. At 40° C. and at a hydrogen concentration H/M of 0.5, the hydrogen absorbing alloys have the following equilibrium hydrogen pressures: 0.65 atm for mother alloy A1, 0.40 atm for mother alloy A2, 0.25 atm for mother alloy A3, and 0.25 atm for mother alloy B1. Mm (misch metal) for use in the present embodiment is a mixture of rare-earth elements in the La:Ce:Pr:Nd ratio of 30:40:10:20 (by weight).

Using the combinations of mother alloy A1 and mother alloy B1, the combination of mother alloy A2 and mother alloy B1 and the combination of mother alloy A3 and mother alloy B1, hydrogen absorbing alloy electrodes for testing were prepared by the process to be described later, and the test samples were checked for electrochemical characteristics (single-electrode characteristics).

Described below are a process for preparing the mother alloys, process for preparing the electrodes, method of determining the electrochemical characteristics and the results of determination.

A. Preparation of Mother Alloys

The component elements of each of mother alloys A1 to A3 and B1 were mixed together in a specified molar ratio, melted in an arc furnace having an argon atmosphere and then spontaneously cooled to prepare a block of hydrogen absorbing alloy. The alloy block was pulverized into a powder having a mean particle size of 120 μm.

B. Preparation of Hydrogen Absorbing Alloy Electrodes

Composite alloys were prepared from 50 g portions of the mother alloy powders by mixing the powder portions in the above-mentioned combinations, followed by sintering or mechanical alloying.

Each alloy prepared by sintering or mechanical alloying was pulverized again into a powder having a mean particle size of 75 μm. A hydrogen absorbing alloy electrode in the form of a disk with a diameter of 20 mm was thereafter prepared by mixing 0.1 g of polytetrafluoroethylene (PTFE) serving as a binder with 0.5 g of the alloy powder, filling a porous piece of blowing nickel with the mixture and press-molding the resulting piece at 1.2 tons/cm².

C. Determination of Electrochemical Characteristics

For the determination electrochemical characteristics, single electrode test cells were assembled which were the same as the one used for the first embodiment and shown in FIG. 2. For the determination of the characteristics, each test cell was subjected to repeated charge-discharge cycles to measure the discharge capacity (mAh/g) every cycle.

D. Results of Determination

FIG. 8 shows the result of EPMA analysis conducted for the hydrogen absorbing alloy electrode prepared by sintering from the foregoing combination of mother alloy A1 ($MmNi_{3.1}Co_{1.0}Mn_{0.9}$) and mother alloy B1 ($MmNi_{3.1}Co_{1.0}Al_{0.9}Mn_{0.1}$)

As illustrated, the components of mother alloy A1 are detected in the respective molar ratios as an alloy species 1, and the components of mother alloy B1 are detected in the listed molar ratios as an alloy species 2. Further a new composition different from the compositions of the alloy species 1, 2 is detected at joint interfaces between alloy particles. The same result as above was obtained with the hydrogen absorbing alloy electrode prepared by mechanical alloying.

These results indicate that the sintering or mechanical alloying process forms a joint layer C of new composition containing the component elements of the mother alloys A1, B1 at the joint interface therebetween.

FIG. 9 shows the electrochemical characteristics of hydrogen absorbing alloy electrodes determined. These electrodes are an electrode (Product 1 of the invention) prepared from "alloy combination 1," i.e., the combination of mother alloy A1 ($MmNi_{3.1}Co_{1.0}Mn_{0.9}$) and mother alloy B1 ($MmNi_{3.1}Co_{1.0}Al_{0.9}Mn_{0.1}$) by sintering, an electrode (Product 2 of the invention) prepared from the same "alloy combination 1" by mechanical alloying, an electrode (Comparative Example 1) prepared from mother alloy A1 only, an electrode (Comparative Example 2) prepared from mother alloy B1 only, and an electrode (Comparative Example 3) prepared from the powder mixture of mother alloy A1 and mother alloy B1 by press molding only without sintering or mechanical alloying.

Products 1 and 2 of the invention are both improved over the three comparative examples in initial activation degree and capacity retentivity. Especially comparison with Comparative Example 3 wherein the two alloys are merely mixed together, and no joint layer is formed substantiates that the joint layer of the invention produces a synergistic effect on the initial activation degree and charge-discharge cycle life.

FIG. 10 shows the electrochemical characteristics of hydrogen absorbing alloy electrodes determined. These electrodes are an electrode (Product 1 of the invention) prepared from "alloy combination 2," i.e., the combination of mother alloy A2 ($MmNi_{3.3}Co_{0.9}Al_{0.1}Mn_{0.7}$) and mother alloy B1 ($MmNi_{3.1}Co_{1.0}Al_{0.9}Mn_{0.1}$) by sintering, an electrode (Product 2 of the invention) prepared from the same "alloy combination 2" by mechanical alloying, an electrode (Comparative Example 1) prepared from mother alloy A2 only, an electrode (Comparative Example 2) prepared from mother alloy B1 only, and an electrode (Comparative Example 3) prepared from the powder mixture of mother alloy A2 and mother alloy B1 by press molding only without sintering or mechanical alloying.

Products 1 and 2 of the invention achieve an improvement over the foregoing "alloy combination 1" both in initial activation degree and capacity retentivity. Presumably, the reason is that since mother alloy A2 and mother alloy B1 in "alloy combination 2" have nearly the same composition, hydrogen readily passes through the joint interface between these mother alloys, hence improved initial activation degree and capacity retentivity.

FIG. 11 shows the electrochemical characteristics of hydrogen absorbing alloy electrodes determined. These electrodes are an electrode (Product 1 of the invention) prepared from "alloy combination 3," i.e., the combination of mother alloy A3 ($MmNi_{3.1}Co_{0.9}Al_{0.3}Mn_{0.7}$) and mother alloy B1 ($MmNi_{3.0}Co_{1.0}Al_{0.9}Mn_{0.1}$) by sintering, an electrode (Product 2 of the invention) prepared from the same "alloy combination 3" by mechanical alloying, an electrode (Comparative Example 1) prepared from mother alloy A3 only, an electrode (Comparative Example 2) prepared from mother alloy B1 only, and an electrode (Comparative Example 3) prepared from the powder mixture of mother alloy A3 and mother alloy B1 by press molding only without sintering or mechanical alloying.

Products 1 and 2 of the invention both achieve a higher initial activation degree and greater capacity retentivity than "alloy combination 2."

Presumably, the reason is that since mother alloy A3 and mother alloy B1 in "alloy combination 3" have approximately the same equilibrium hydrogen pressure at the same temperature, the joint interface between mother alloy A3 and mother alloy B1 permits hydrogen to readily pass therethrough, hence further improvements in initial activation degree and capacity retentivity.

Hydrogen absorbing alloy electrodes were prepared by sintering from the same combination as "alloy combination 3," i.e., from mother alloy A3 and mother alloy B1 as mixed together in varying ratios, and tested for maximum capacity, initial activation degree and capacity retentivity. FIG. 12 shows the results.

These results indicate that when the proportions of the two alloys are 50 wt. %, the greatest improvement is achieved both in initial activation degree and in capacity retentivity, and that the effect lowers as the proportion of one of the alloys decreases. If the proportion decreases below 5 wt. %, the initial activation degree, as well as the capacity retentivity, lowers below the allowable limit. This is because the joint layer C is not formed satisfactorily if the proportion of one of the alloys is smaller than 5 wt. %.

Accordingly, the proportion of one of the alloys to be mixed together is preferably 20 to 80 wt. %, more preferably 40 to 60 wt. %, most preferably 50 wt. %.

In the case where alkali dry batteries (battery capacity: 1,000 mAh) of AA size and of the type wherein the positive electrode is dominant are to be assembled using the hydrogen absorbing alloy electrode thus prepared as the negative electrode, the other components of the battery to be used include a known sintered nickel electrode serving as the positive electrode, a separator of alkali-resistant nonwoven fabric and 30 wt. % aqueous solution of potassium hydroxide serving as the electrolyte. The alkali dry battery then obtained exhibits higher performance than conventionally.

Other known alloys are usable as the first and second hydrogen absorbing alloys insofar as the alloys have a $CaCu_5$-type structure. For example, $LaNi_{4.95}Mn_{0.05}$ alloy can be used as the first hydrogen absorbing alloy having a high degree of initial activation. The hydrogen absorbing alloy electrode can be prepared alternatively by pulverizing different kinds of hydrogen absorbing alloys into powders and molding a mixture of the powders directly into an electrode by sintering.

Third Embodiment

With reference to FIG. 1, a hydrogen absorbing alloy electrode embodying the invention comprises particles A of a first hydrogen absorbing alloy having a Zr—Ni Laves-phase structure, and particles B of a second hydrogen absorbing alloy joined to the particles A, having a Zr—Ni Laves-phase structure and different from the first hydrogen absorbing alloy in composition, with a joint layer C formed at the resulting joint interfaces and having a new composition containing the component elements of the first and second hydrogen absorbing alloys.

Prepared for use in the present embodiment are a first hydrogen absorbing alloy having a high initial activation degree, i.e., $ZrNi_{1.1}Mn_{0.7}V_{0.2}$ alloy (mother alloy A1) having an $AB_2$-type crystal structure, and second hydrogen absorbing alloys having an excellent charge-discharge cycle life, i.e., $ZrNi_{1.1}Mn_{0.5}V_{0.2}Co_{0.2}$ alloy (mother alloy B1), $ZrNi_{1.1}Mn_{0.4}V_{0.5}$ (mother alloy B2) and $ZrNi_{1.4}Mn_{0.1}V_{0.5}$ (mother alloy B3) which are of $AB_2$-type crystal structure. At 120° C. and at a hydrogen concentration of 0.8 (H/M), the hydrogen absorbing alloys have the following equilibrium hydrogen pressure: 15.8 atm for mother alloy A1, 6.1 atm for mother alloy B1, 4.2 atm for mother alloy B2 and 16.3 atm for mother alloy B3.

Using the combinations of mother alloy A1 and mother alloy B1, the combination of mother alloy A1 and mother alloy B2 and the combination of mother alloy A1 and mother alloy B3, hydrogen absorbing alloy electrodes for testing were prepared by the process to be described later, and the test samples were checked for electrochemical characteristics (single-electrode characteristics).

Described below are a process for preparing the mother alloys, process for preparing the electrodes, method of determining the electrochemical characteristics and the results of determination.

A. Preparation of Mother Alloys

The component elements of each of mother alloys A1 and B1 to B3 were mixed together in a specified molar ratio, melted in an arc furnace having an argon atmosphere and then spontaneously cooled to prepare a block of hydrogen absorbing alloy. The alloy block was pulverized into a powder having a mean particle size of 120 µm.

B. Preparation of Hydrogen Absorbing Alloy Electrodes

Composite alloys were prepared from 50 g portions of the mother alloy powders by mixing the powder portions in the above-mentioned combinations, followed by sintering or mechanical alloying.

Each alloy prepared by sintering or mechanical alloying was pulverized again into a powder having a mean particle size of 75 µm. A hydrogen absorbing alloy electrode in the form of a disk with a diameter of 20 mm was thereafter prepared by mixing 0.1 g of polytetrafluoroethylene (PTFE) serving as a binder with 0.5 g of the alloy powder, filling a porous piece of blowing nickel with the mixture and press-molding the resulting piece at 1.2 tons/cm$^2$.

C. Determination of Electrochemical Characteristics

For the determination electrochemical characteristics, single electrode test cells were assembled which were the same as the one used for the first embodiment and shown in FIG. 2. For the determination of the characteristics, each test cell was subjected to repeated charge-discharge cycles to measure the discharge capacity (mAh/g) every cycle.

D. Results of Determination

FIG. 13 shows the result of EPMA analysis conducted for the hydrogen absorbing alloy electrode prepared by sintering from the foregoing combination of mother alloy A1 ($ZrNi_{1.1}Mn_{0.7}V_{0.2}$) and mother alloy B1 ($ZrNi_{1.1}Mn_{0.5}V_{0.2}Co_{0.2}$).

As illustrated, the components of mother alloy A1 are detected in the respective molar ratios as an alloy species 1, and the components of mother alloy B1 are detected in the listed molar ratios as an alloy species 2. Further a new composition different from the compositions of the alloy species 1, 2 is detected at joint interfaces between alloy particles. The same result as above was obtained with the hydrogen absorbing alloy electrode prepared by mechanical alloying.

These results indicate that the sintering or mechanical alloying process forms a joint layer C of new composition containing the component elements of the mother alloys A1, B1 at the joint interface therebetween.

FIG. 14 shows the electrochemical characteristics of hydrogen absorbing alloy electrodes determined. These electrodes are an electrode (Product 1 of the invention) prepared from "alloy combination 1," i.e., the combination of mother alloy A1 ($ZrNi_{1.1}Mn_{0.7}V_{0.2}$) and mother alloy B1 ($ZrNi_{1.1}Mn_{0.5}V_{0.2}Co_{0.2}$) by sintering, an electrode (Product 2 of the invention) prepared from the same "alloy combination 1" by mechanical alloying, an electrode (Comparative Example 1) prepared from mother alloy A1 only, an electrode (Comparative Example 2) prepared from mother alloy B1 only, and an electrode (Comparative Example 3) prepared from the powder mixture of mother alloy A1 and mother alloy B1 by press molding only without sintering or mechanical alloying.

In initial activation degree, Products 1 and 2 of the invention are comparable to Comparative Example 1 and superior to Comparative Examples 2 and 3. As to the capacity retentivity, Products 1 and 2 of the invention are comparable to Comparative Example 2 and superior to Comparative Examples 1 and 3. Especially comparison with Comparative Example 3 wherein the two alloys are merely mixed together, with no joint layer formed therebetween substantiates that the joint layer of the invention produces a synergistic effect on the initial activation degree and charge-discharge cycle life.

FIG. 15 shows the electrochemical characteristics of hydrogen absorbing alloy electrodes determined. These electrodes are an electrode (Product 1 of the invention) prepared from "alloy combination 2," i.e., the combination of mother alloy A1 ($ZrNi_{1.1}Mn_{0.7}V_{0.2}$) and mother alloy B2 ($ZrNi_{1.1}Mn_{0.4}V_{0.5}$) by sintering, an electrode (Product 2 of the invention) prepared from the same "alloy combination 2" by mechanical alloying, an electrode (Comparative Example 1) prepared from mother alloy A1 only, an electrode (Comparative Example 2) prepared from mother alloy B2 only, and an electrode (Comparative Example 3) prepared from the powder mixture of mother alloy A1 and mother alloy B2 by press molding only without sintering or mechanical alloying.

Products 1 and 2 of the invention exhibit a higher initial activation degree than is achieved by the foregoing "alloy combination 1" and are comparable to "alloy combination 1" in capacity retentivity. Presumably, the reason is that since mother alloy A1 and mother alloy B2 in "alloy combination 2" have nearly the same composition, hydrogen readily passes through the joint interface between these mother alloys, hence improved initial activation degree and capacity retentivity.

FIG. 16 shows the electrochemical characteristics of hydrogen absorbing alloy electrodes determined. These electrodes are an electrode (Product 1 of the invention) prepared from "alloy combination 3," i.e., the combination of mother alloy A1 ($ZrNi_{1.1}Mn_{0.7}V_{0.2}$) and mother alloy B3 ($ZrNi_{1.4}Mn_{0.1}V_{0.5}$) by sintering, an electrode (Product 2 of the invention) prepared from the same "alloy combination 3" by mechanical alloying, an electrode (Comparative Example 1) prepared from mother alloy A1 only, an electrode (Comparative Example 2) prepared from mother alloy B3 only, and an electrode (Comparative Example 3) prepared from the powder mixture of mother alloy A1 and mother alloy B3 by press molding only without sintering or mechanical alloying.

Products 1 and 2 of the invention are both comparable to "alloy combination 2" in initial activation degree and superior to "alloy combination 2" in capacity retentivity. Presumably, the reason is that since mother alloy A1 and mother alloy B3 in "alloy combination 3" have approximately the same equilibrium hydrogen pressure at the same temperature, the joint interface between mother alloy A1 and mother alloy B3 permits hydrogen to readily pass therethrough, hence further improvements in initial activation degree and capacity retentivity.

Hydrogen absorbing alloy electrodes were prepared by sintering from the same combination as "alloy combination 3," i.e., from mother alloy A1 and mother alloy B3 as mixed together in varying ratios, and tested for maximum capacity, initial activation degree and capacity retentivity. FIG. 17 shows the results.

These results indicate that when the proportions of the two alloys are 50 wt. %, the greatest improvement is achieved both in initial activation degree and in capacity retentivity, and that the effect lowers as the proportion of one of the alloys decreases. If the proportion decreases below 5 wt. %, the initial activation degree, as well as the capacity retentivity, lowers below the allowable limit. This is because the joint layer C is not formed satisfactorily if the proportion of one of the alloys is smaller than 5 wt. %.

Accordingly, the proportion of one of the alloys to be mixed together is preferably 20 to 80 wt. %, more preferably 40 to 60 wt. %, most preferably 50 wt. %.

In the case where alkali dry batteries (battery capacity: 1,000 mAh) of AA size and of the type wherein the positive electrode is dominant are to be assembled using the hydrogen absorbing alloy electrode thus prepared as the negative electrode, the other components of the battery to be used include a known sintered nickel electrode serving as the positive electrode, a separator of alkali-resistant nonwoven fabric and 30 wt. % aqueous solution of potassium hydroxide serving as the electrolyte. The alkali dry battery then obtained exhibits higher performance than conventionally.

Other known alloys are usable as first and second hydrogen absorbing alloys insofar as they have a Zr—Ni Laves phase structure.

The embodiments described above are intended to illustrate the present invention and should not be construed as limiting the invention defined in the appended claims or as reducing the scope thereof. The electrodes of the invention are not limited to the foregoing embodiments in structure but can of course be modified variously without departing from the spirit of the invention as set forth in the claims.

What is claimed is:

1. A hydrogen absorbing alloy electrode which comprises at least two kinds of hydrogen absorbing alloys having different compositions and wherein particles A of a first hydrogen absorbing alloy having a $CaCu_5$-type structure are joined to particles B of a second hydrogen absorbing alloy having a $CaCu_5$-type structure and different from the first hydrogen absorbing alloy in composition to form at the resulting joint interfaces a joint layer C of a new composition containing the component elements of the first and second hydrogen absorbing alloys.

2. A hydrogen absorbing alloy electrode as defined in claim 1 wherein said hydrogen absorbing alloy is pulverized into a powder and provided as a filling in an electrically conductive substrate, and the joint layer C of new composition is exposed on the surface of the pulverized particles where hydrogen absorption and desorption reactions proceed.

3. A hydrogen absorbing alloy electrode as defined in claim 1 wherein the first and second hydrogen absorbing alloys comprise the same component elements.

4. A hydrogen absorbing alloy electrode as defined in claim 1 wherein the first and second hydrogen absorbing alloys have substantially the same equilibrium hydrogen pressure at the same temperature.

5. A hydrogen absorbing alloy electrode as defined in claim 1 wherein the lower of the proportions of the first and second hydrogen absorbing alloys is at least 5 wt. %.

6. A hydrogen absorbing alloy electrode as defined in claim 1 wherein the particles A of the first hydrogen absorbing alloy and the particles B of the second hydrogen absorbing alloy are joined by sintering or mechanical alloying.

7. A hydrogen absorbing alloy electrode which comprises at least two kinds of hydrogen absorbing alloys having different compositions and wherein particles A of a first hydrogen absorbing alloy having a Zr—Ni Laves-phase structure are joined to particles B of a second hydrogen absorbing alloy having a Zr—Ni Laves-phase structure and different from the first hydrogen absorbing alloy in composition to form at the resulting joint interfaces a joint layer C of a new composition containing the component elements of the first and second hydrogen absorbing alloys.

8. A hydrogen absorbing alloy electrode as defined in claim 7 wherein said hydrogen absorbing alloy is pulverized into a powder and provided as a filling in an electrically conductive substrate, and the joint layer C of new composition is exposed on the surface of the pulverized particles where hydrogen absorption and desorption reactions proceed.

9. A hydrogen absorbing alloy electrode as defined in claim 7 wherein the first and second hydrogen absorbing alloys comprise the same component elements.

10. A hydrogen absorbing alloy electrode as defined in claim 7 wherein the first and second hydrogen absorbing alloys have substantially the same equilibrium hydrogen pressure at the same temperature.

11. A hydrogen absorbing alloy electrode as defined in claim 7 wherein the lower of the proportions of the first and second hydrogen absorbing alloys is at least 5 wt. %.

12. A hydrogen absorbing alloy electrode as defined in claim 7 wherein the particles A of the first hydrogen absorbing alloy and the particles B of the second hydrogen absorbing alloy are joined by sintering or mechanical alloying.

* * * * *

UNITED STATES PATENT AND TRADEMARK OFFICE
CERTIFICATE OF CORRECTION

PATENT NO.: 5,876,869
DATED     : Mar. 2, 1999
INVENTOR(S): Nakamura et al.

It is certified that error appears in the above-identified patent and that said Letters Patent is hereby corrected as shown below:

On the title page, item [30]:
    [30] Foreign Application Priority Data change the third document number from "7-347222" to --7-347422--

Signed and Sealed this

Seventh Day of September, 1999

Attest:

Attesting Officer

Q. TODD DICKINSON

Acting Commissioner of Patents and Trademarks